Nov. 22, 1966 J. NITKIEWICZ 3,286,591
ADJUSTABLE MOUNTING PLATE
Filed March 30, 1965 2 Sheets-Sheet 1
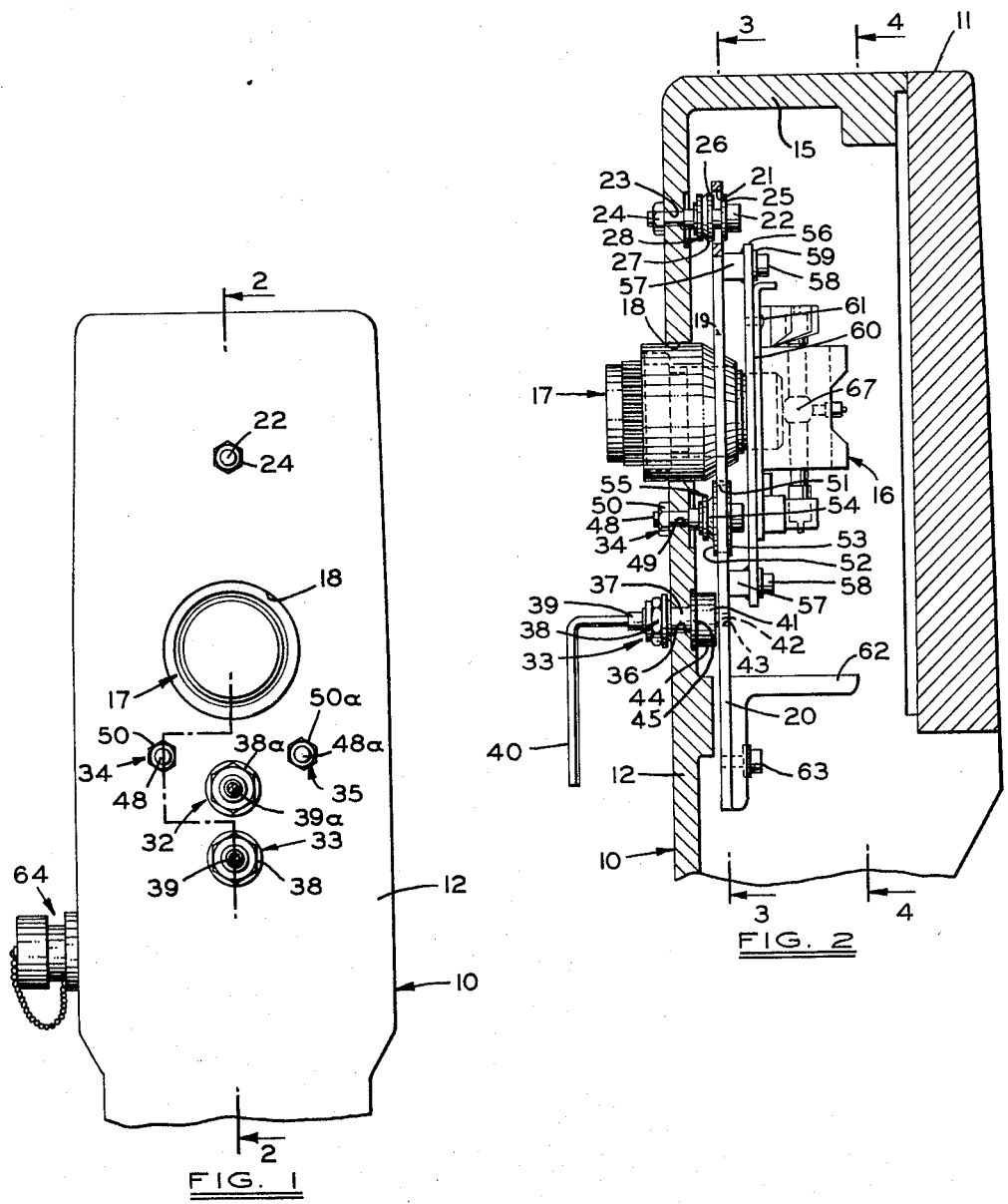
INVENTOR.
JOSEPH NITKIEWICZ
BY
Bower & Patalidis
ATTORNEYS Nov. 22, 1966     J. NITKIEWICZ     3,286,591
ADJUSTABLE MOUNTING PLATE Filed March 30, 1965     2 Sheets-Sheet 2

INVENTOR.
JOSEPH NITKIEWICZ
BY
Bower & Patalidis
ATTORNEYS

United States Patent Office 3,286,591
Patented Nov. 22, 1966

3,286,591
ADJUSTABLE MOUNTING PLATE
Joseph Nitkiewicz, Farmington, Mich., assignor to
Optical Gaging Products, Inc., Rochester, N.Y.
Filed Mar. 30, 1965, Ser. No. 444,013
17 Claims. (Cl. 88—24)

This invention relates generally to an adjustable mounting plate apparatus, and more particularly, to a novel and improved adjustable mounting plate apparatus for adjusting the position of one member relative to another member by adjustments in two directions which are perpendicular to each other and by the employment of a single adjusting plate for effecting said adjustments.

The problem of adjusting one member relative to another member exists in many arts, as for example in the photography art, the contour projector art, and the like. In the contour projector art, it is necessary to center a lamp source with the optical axis of a collimator. In effecting a centering operation of this type it is necessary to move one or the other of these members in two directions perpendicular to each other, as for example in the horizontal and vertical directions. Heretofore, in order to adjust one member relative to another in two directions, it has been necessary to provide a complex apparatus having at least two cross slides or adjusting plates disposed perpendicular to each other, and adjustable or movable relative to each other, with one of the slides or plates carrying the one member which is to be adjusted relative to the other member.

In view of the foregoing, it is an important object of the present invention to provide a novel and improved adjustable mounting plate apparatus for supporting one member for adjustment relative to another member in two perpendicular directions and with the use of a single adjusting plate.

It is another object of the present invention to provide a novel and improved adjustable mounting plate apparatus for adjusting the position of one member relative to another member, which is simple and compact in construction, economical to manufacture, efficient in operation, and easy to operate.

It is a further object of the present invention to provide a novel and improved adjustable mounting plate apparatus for supporting a first member for movement relative to a second member in two perpendicular directions, by a pair of eccentric adjusting means which is adapted to move an adjusting plate carrying said first member in two directions, and wherein said adjusting plate is supported at a point spaced apart from the eccentric adjusting means by a pivot means which permits rotation about said point as well as straight-line motion of the adjusting plate relative to said point and in a direction parallel to the movement effected by at least one of the eccentric adjusting means.

It is still another object of the present invention to provide a novel and improved adjustable mounting plate apparatus for adjusting the position of one member relative to another member, including a support means, an adjusting plate adapted to carry one member, means for mounting said adjusting plate on said support means for simultaneous pivotal and straight-line movement of the adjusting plate relative to the support means, and means connected to said adjusting plate at position spaced apart from the means mounting said adjusting plate to said support means, for selective adjusting of said adjustment plate in two perpendicular directions to adjust the position of said one member relative to the position of another member.

Other objects, features and advantages of this invention will be apparent from the following detailed description, appended claims, and the accompanying drawings.

In the drawings:

FIG. 1 is a front elevational view of a contour projector lamp adjusting assembly provided with an adjustable mounting plate apparatus made in accordance with the principles of the present invention;

FIG. 2 is an elevational section view of the structure illustrated in FIG. 1, taken along the line 2—2 thereof, and looking in the direction of the arrows;

Figure 4:
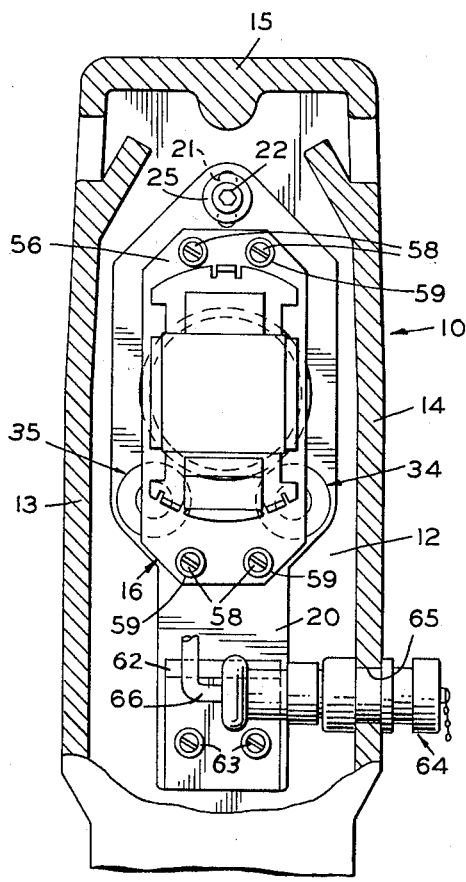

Referring now to the drawings, and in particular to FIGS. 1 and 2, the numeral 10 generally indicates the support means or housing for a lamp which is mounted for adjustable movement relative to a collimator for a contour projector. Although the adjustable mounting plate apparatus of the present invention is illustrated as being used with a particular structure as shown in the drawings, it will be understood that the invention may also be used for other adjustment purposes, as for example, in a movie projector for focus adjustment purposes.

Figure 3:
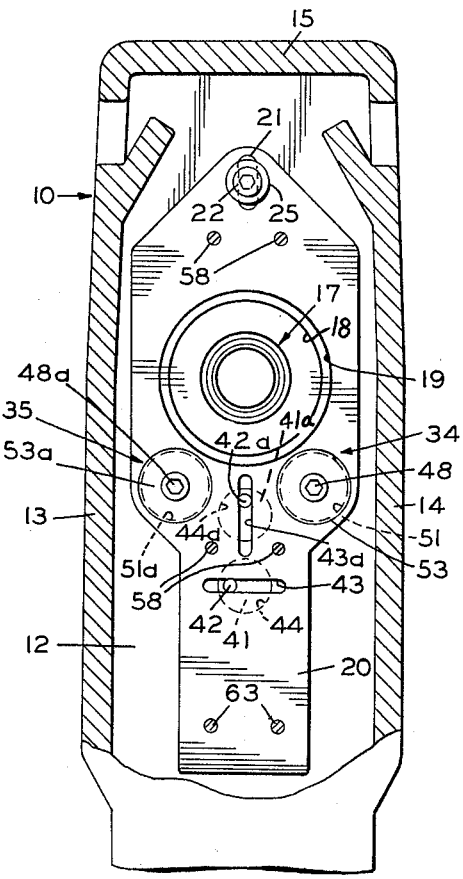
FIG. 3 is an elevational section view of the structure illustrated in FIG. 2, taken along the line 3—3 thereof, and looking in the direction of the arrows; and, FIG. 4 is an elevational section view of the structure illustrated in FIG. 2, taken along the line 4—4 thereof, and looking in the direction of the arrows.

As best seen in FIGS. 2 and 3, the housing 10 includes the rear wall 11 on which is detachably mounted the front hollow portion of the housing which comprises the front wall 12, the side walls 13 and 14, and the top wall 15. The front portion of the housing 10 is detachably secured to the rear or support wall 11 by any suitable means, as by a plurality of suitable mounting screws.

As shown in FIG. 2, the numeral 16 generally indicates a mercury arc lamp which is mounted in the housing 10 for the coaction with the collimator 17. In use, the filament of the mercury arc lamp 16 must be centered with the optical axis of the collimator and it has been found that the adjustable mounting plate apparatus of the present invention is an efficient means for carrying out such function.

As shown in FIGS. 1, 2 and 3, the collimator 17 is fixedly mounted, by any suitable means, in the mounting hole 18 formed through the housing front wall 12. As illustrated in FIGS. 2 and 3, the collimator 17 extends into the housing 10 and through the clearance hole 19 formed through the adjusting plate 20. The adjusting plate 20 carries the mercury arc lamp 16 and is supported by the following described structure for centering the filament of the lamp 16 to the optical axis of the collimator 17.

As shown in FIG. 3, the adjusting plate 20 is elongated in plan figuration and is provided with a substantially pointed shape on the upper end thereof through which is formed the elongated slot 21. The slot 21 is disposed with its longest axis along the perpendicular axis of the plate 20, and it is adapted to slidably receive the pivot member or shoulder screw 22. As shown in FIG. 2, the screw 22 is threadably mounted through a threaded hole 23 formed through the front wall 12 of the housing 10. The screw 22 is secured in an axially adjusted position by the nut 24.

The adjusting plate 20 is maintained in a spaced apart position in the housing 10, at a point inwardly from the front wall 12, by the following described structure. A pair of plain washers 25 and 26 are disposed on opposite sides of the slot 21. A bow or friction washer 27 is mounted on the screw 22 between the wall 12 and the washer 26. The friction washer 27, the plain washers 25 and 26, and the plate 20 are biased inwardly of the wall 12, against the enlarged head of the screw 22, by any suitable means, as for example by a snap ring and washer assembly generally indicated by the numeral 28. It will be seen that the last described structure supports the adjusting plate 20 for both pivotal movement about the screw 22 and for vertical, straight-line movement which is accomplished by the screw 22 sliding in the slot 21.

The adjusting plate 20 is adjusted about the screw 22 by means of a pair of eccentric adjusting means, generally indicated by the numerals 32 and 33 in FIG. 1. The eccentric adjusting means 32 provides adjustment of the plate 20 in the horizontal direction, and the eccentric adjusting means 33 provides adjustment of the plate 20 in the vertical direction. The eccentric adjusting means 32 and 33 are constructed similarly and only the adjusting means 33 will be described in detail. The similar parts of the adjusting means 32 will be marked with corresponding reference numerals followed by the small letter "a." The adjusting plate 20 is adapted to be retained in a desired adjusted position by means of a pair of friction clamp means generally indicated by the numerals 34 and 35 in FIG. 1.

As shown in FIG. 2, the eccentric adjusting means 33 includes the horizontally disposed shaft 37 which is rotatably mounted in the hole 36 formed through the housing front wall 12, in a position spaced apart downwardly from the pivot shoulder screw 22 and in vertical alignment with screw 22.

The shaft 37 is provided with an outwardly directed bias, for maintaining the shaft in an adjusted position, by an assembly of a friction or bow washer, a plain washer, and a lock nut, generally indicated by the numeral 38 in FIG. 2. The other end of the shaft 37 extends through the last mentioned assembly 38, as indicated by the numeral 39 in FIG. 2. The shaft end 39 is provided with an Allen wrench socket which is adapted to receive the Allen wrench 40 for rotating shaft 37, as described in detail hereinafter.

As shown in FIG. 2, the inner end of the shaft 37 is provided with the integral, enlarged circular head 41 which has its inner face seated against the washer 45. The washer 45 is operatively mounted around the shaft 37 and is seated in the circular recess 44 formed in the inner face of the housing front wall 12. The shaft head 41 has integrally formed thereon, an inwardly extended eccentric cam shaft 24 which is slidably mounted in the horizontally disposed cam slot 43 formed in the plate 20. It will be seen that the eccentric cam shaft 42 is disposed in a position parallel to the shaft 37, but in an offset or eccentric position, whereby when the shaft 37 is turned, the cam shaft 42 will be moved upwardly and downwardly and the plate 20 will be moved in the corresponding directions. The eccentric cam shaft 42 moves in the horizontal slot 43 but it provides vertical movement of the adjusting plate 20. As previously described, the pivot slot 21 is formed with its longest dimension disposed longitudinally of the plate 20, in a direction perpendicular to the slot 43, and coactive with the eccentric shaft 42 and the cam slot 43 to permit the plate 20 to be moved vertically.

As shown in FIG. 1, the eccentric adjusting means 32 is mounted with its shaft 39a in vertical alignment with the pivot screw 22 and the shaft 39 of the eccentric adjusting means 33. As shown in FIG. 3, the eccentric cam shaft 42a for the adjusting means 32 is disposed to operate in the vertically disposed cam slot 43a. The rotation of the shaft head 41a will cause the cam shaft 42a to slide in the vertical slot 43a and move the mounting plate 20 sidewardly, as viewed in FIG. 3, or in the horizontal direction. As shown in FIG. 3, the cam slot 43a is disposed perpendicular to the cam slot 43. Although the cam slot 43a is shown as being disposed above the cam slot 43, it may also be disposed below the slot 43 and still provide the same function.

The adjusting plate 20 is adapted to be retained in an adjusted position by the means of the two friction clamp means 34 and 35 which are each constructed in the same manner. Accordingly, only one of these friction clamp means will be described and the other will be marked with the same reference numerals followed by the small letter "a." As shown in FIG. 3, the friction clamp means 34 and 35 are disposed on opposite sides of the cam slot 43a and in positions spaced downwardly from the pivot screw 22. However, it will be understood that the friction clamp means 34 and 35 may be disposed in other suitable positions on the adjusting plate 20.

As shown in FIG. 2, the friction clamp means 34 includes the shoulder screw 48 which is threadably mounted through the threaded hole 49 formed through the front wall 12 of the housing 10. The screw 48 is secured in an axially adjusted position by means of the nut 50. As shown in FIGS. 2 and 3, the screw 48 extends horizontally into the housing 10 and passes through an enlarged circular clearance opening 51 in the plate 20. The screw 48 is frictionally engaged with the adjusting plate 20 by the following structure. A pair of plain washers 52 and 53 are carried on the screw 48 on opposite sides of the plate 20. As shown in FIG. 2, a bow or friction washer 54 engages the outer face of the plain washer 52 and forces it against the outer face of the plate 20. The last mentioned action forces the plate 20 against the washer 53 which engages the enlarged head of the screw 48. The bow washer 54 is held in the last mentioned friction producing and clamping position by means of a plain washer and snap ring assembly, generally indicated by the numeral 55. It will be seen that the last mentioned spring washer and plain washer assembly on the screw 48 will permit the adjusting plate 20 to be moved relative to the screw 48 yet maintain a friction clamping action on the plate 20. The two friction clamp means 34 and 35 function in the same manner, and they coact together to provide an efficient friction clamp means which retains the plate 20 in an adjusted position yet permits ready and quick adjustment of the plate 20 by the eccentric adjusting means 32 and 33.

The lamp 16 which is to be adjusted relative to the collimator 17 may be secured to the adjusting plate 20 by any suitable means. As illustrated, the lamp 16 is mounted on the lamp base plate 60 which is secured to the lamp mounting plate 56 by any suitable means, as by a plurality of rivets 61. The lamp mounting plate 56 is spaced apart inwardly from the adjusting plate 20 by a plurality of sleeve spacers 57 which are fixed on the outer side of the plate 56 by any suitable means, as by welding. The lamp mounting plate 56 is secured to the adjusting plate 20 by means of a plurality of socket head cap screws 58 and washers 59. Screws 58 pass through suitable holes in the lamp mounting plate 56 and the sleeve spacers 57, and thence into threaded engagement with suitable threaded holes in the adjusting plate 20.

Although the lamp 16 is illustrated as comprising a mercury arc lamp for use with the collimator 17, it will be understood that the adjusting plate 20 may carry other types of lamps for use with the collimator 17 and for adjustment relative thereto. For example, a bracket 62, as shown in FIGS. 2 and 4, may be mounted on the inner end of the plate 20. The bracket 62 may be used to support a socket for a socket-type lamp for adjustment relative to the collimator 17. The bracket 62 is secured to the plate 20 by any suitable means, as by the socket head cap screws 63. The housing 10 also supports the lamp cable plug 64 which is mounted in the hole 65 in the housing side wall 14, by any suitable means, and from which extends the power cable 66 for the lamp 16.

In use, the filament of the lamp 16 may be centered to the optical axis of the collimator 17 by adjusting the eccentric adjusting means 32 and 33 with an Allen wrench 40 in the necessary directions to effect the centering operation. The rotation of the adjusting screw 39a will move the eccentrically mounted cam shaft 42a so as to engage the sides of the vertically disposed slot 43a. The adjusting plate 20 is pivoted by this action about the screw 22 to effect an adjustment of the plate 20 in a first direction or a horizontal direction. The required vertical adjustment is then effected by the eccentric adjusting shaft 39 which, when turned, causes the eccentric cam shaft 42 to engage the upper or lower side surfaces of the horizontal slot 42 so as to move the adjusting plate 20 upwardly or downwardly by the coaction of the vertical slot 21 with the pin 22. The vertical and horizontal adjustments continue until the desired centering operation has been accomplished. It will be seen that the slot 21 guides the adjusting plate 20 in the vertical adjustment movements of this plate. The slot 21 must be disposed parallel to at least one of the eccentric adjusting means slots 43 or 43a to provide the necessary relative movements provided by the eccentric adjusting means 32 and 33. It will be seen that the center point 67 of the lamp filament moves through a slight arcuate path during a centering operation.

Experience has shown that the adjustable mounting plate assembly of the present invention is a practical and efficient apparatus for effecting a quick and accurate adjustment of two members relative to each other for centering or other alignment operations. It will be understood that the adjustable mounting plate apparatus of the present invention may be used for other purposes, and in other structures, than that illustrated.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. An adjustable mounting plate apparatus for adjusting the position of one member relative to another member, comprising:
   (a) a support means;
   (b) an adjusting plate adapted to carry one member;
   (c) means for mounting said adjusting plate on said support means for simultaneous pivotal and straight-line movement of the adjusting plate relative to the support means; and,
   (d) means connected to said adjusting plate at positions spaced apart from the means mounting said adjusting plate to said support means, for adjusting said adjusting plate in two perpendicular directions to adjust the position of said one member relative to the position of another member.

2. An adjustable mounting plate apparatus as defined in claim 1, wherein:
   (a) said means for mounting said adjusting plate on said support means includes,
       (1) a pivot member which is secured to said support means, and,
       (2) said adjusting plate is provided with an elongated slot which has the longest dimension thereof disposed parallel to one of said two perpendicular directions, and said pivot member is mounted through said slot, whereby said adjusting plate may be simultaneously pivoted about said pivot member and moved in straight-line motion relative to said pivot member.

3. An adjustable mounting plate apparatus as defined in claim 2, wherein:
   (a) said means for mounting said adjusting plate on said support means includes a friction clamp means mounted on said pivot member.

4. An adjustable mounting plate apparatus as defined in claim 1, wherein:
   (a) said means connected to said adjusting plate for adjusting said adjusting plate in two perpendicular directions includes,
       (1) a pair of eccentric adjusting means and having an eccentric member operatively engaged with the adjusting plate.

5. An adjustable mounting plate apparatus as defined in claim 4, wherein:
   (a) the eccentric member of one of said eccentric adjusting means is arranged to adjust the adjusting plate in a first direction, and the eccentric member on the other of said eccentric adjusting means is arranged to adjust the adjusting plate in a second direction perpendicular to said first direction.

6. An adjustable mounting plate apparatus as defined in claim 1, including:
   (a) clamp means operatively connected to said adjusting plate for retaining the adjusting plate in an adjusted position.

7. An adjustable mounting plate apparatus as defined in claim 6, wherein:
   (a) said clamp means comprises a friction clamp structure adapted to retain the adjusting plate in an adjusted position and yet allow the eccentric adjusting means to be operated automatically.

8. An adjustable mounting plate apparatus as defined in claim 7, wherein:
   (a) said friction clamp structure includes,
       (1) a rigid member fixed to said support means and extended into said housing and through a clearance hole in said adjusting plate, and,
       (2) a spring washer assembly carried on said rigid member and frictionally engaged with said adjusting plate to retain the adjusting plate in an adjusted position.

9. An adjustable mounting plate apparatus for adjusting the position of one member relative to another member, comprising:
   (a) a support means;
   (b) an adjusting plate adapted to carry one member;
   (c) means for mounting said adjusting plate on said support means for simultaneous pivotal and straight-line movement of the adjusting plate relative to the support means;
   (d) a pair of spaced apart eccentric adjusting means rotatably mounted on said support means and disposed in alignment with said means for mounting said adjustment plate on said support means;
   (e) said adjusting plate being provided with a pair of elongated cam slots perpendicular to each other; and,
   (f) each of said eccentric adjusting means including an eccentrically mounted cam shaft slidably engaged in one of said cam slots, whereby when one of the eccentric adjusting means is rotated the adjusting plate is moved in a first direction and when the other of said eccentric adjusting means is rotated the adjusting plate is moved in a second direction perpendicular to the first direction.

10. An adjustable mounting plate apparatus as defined in claim 9, wherein:
    (a) said means for mounting said adjusting plate on said support means includes,
        (1) a pivot member which is secured to said support means, and,
        (2) said adjusting plate is provided with an elongated pivot slot which has the longest dimension thereof disposed parallel to one of said two cam slots, and said pivot member is mounted through said pivot slot, whereby said adjusting plate may be simultaneously pivoted about said pivot member and moved in straight-line motion relative to said pivot member when said eccentric adjusting means are operated.

11. An adjustable mounting plate apparatus as defined in claim 10, wherein:
    (a) said means for mounting said adjusting plate on said support means includes a friction clamp means mounted on said pivot member.

12. An adjustable mounting plate apparatus as defined in claim 9, including:

(a) clamp means operatively connected to said adjusting plate for retaining the adjusting plate in an adjusted position.

13. An adjustable mounting plate apparatus as defined in claim 12, wherein:
    (a) said clamp means includes at least one friction clamp structure mounted on said support means and frictionally engaged with said adjusting plate to retain the adjusting plate in an adjusted position.

14. An adjustable mounting plate apparatus as defined in claim 13, wherein:
    (a) said fricion clamp structure comprises a spring washer assembly frictionally engaged with said adjusting plate to retain the adjusting plate in an adjusted position.

15. An adjustable mounting plate apparatus for adjusting the position of one member relative to another member, comprising:
    (a) a support means;
    (b) an adjusting plate adapted to carry one member;
    (c) said adjusting plate being provided with an elongated pivot slot disposed with the longest dimension thereof parallel to the longitudinal axis of the adjusting plate;
    (d) a pivot pin having one end secured to said support means and the other end thereof extended through said elongated pivot slot in sliding engagement therewith;
    (e) a pair of spaced apart shafts rotatably mounted on said support means and disposed in alignment with said pivot pin and in positions spaced apart from each other and said pivot pin;
    (f) a cam shaft eccentrically mounted on each of said spaced apart shafts and disposed parallel to said shafts and perpendicular to said adjusting plate;
    (g) said adjusting plate being provided with a pair of elongated cam slots disposed perpendicular to each other, and each of said cam slots having one of said cam shafts extended therethrough in sliding engagement therewith;
    (h) whereby when said rotatably mounted spaced apart shafts are selectively rotated the adjusting plate will be moved in two perpendicular directions to adjust the position of said one member relative to the position of another member.

16. An adjustable mounting plate apparatus as defined in claim 15, including:
    (a) clamp means operatively connected to said adjusting plate for retaining the adjusting plate in an adjusted position.

17. An adjustable mounting plate apparatus as defined in claim 16, wherein:
    (a) said clamp means comprises a pair of friction clamp members wherein each friction clamp means has one end fixed to said support means and the other end in frictional engagement with said adjusting plate.

References Cited by the Examiner
UNITED STATES PATENTS

| | | | |
|---|---|---|---|
| 1,549,837 | 8/1925 | Hull | 240—44.2 |
| 2,541,883 | 2/1951 | Morgan | 248—287 X |
| 2,977,461 | 3/1961 | Jones | 240—78 |
| 3,162,378 | 12/1964 | Zillmer | 240—44.2 |

NORTON ANSHER, *Primary Examiner.*